United States Patent [19]

Offenburger

[11] Patent Number: 5,104,507
[45] Date of Patent: Apr. 14, 1992

[54] ANODIC-CATHODIC COATING FOR FASTENERS

[75] Inventor: Mark J. Offenburger, Schaumburg, Ill.

[73] Assignee: Illinois Tool Works Inc., Glenview, Ill.

[21] Appl. No.: 415,808

[22] Filed: Oct. 2, 1989

[51] Int. Cl.$^5$ .............................................. C25D 13/06
[52] U.S. Cl. .................. 204/180.6; 204/181.1; 205/171; 205/208; 205/210; 205/224; 205/917
[58] Field of Search ............... 204/180.2, 180.6, 181.1, 204/38.1, 38.7

[56] References Cited

U.S. PATENT DOCUMENTS

| | | | |
|---|---|---|---|
| 3,663,383 | 5/1972 | Matsuda et al. | 204/181.1 |
| 4,175,018 | 11/1979 | Gacesa | 204/181.1 |
| 4,208,262 | 6/1980 | Kubo et al. | 204/181.1 |
| 4,421,620 | 12/1983 | Kaylo et al. | 204/181.1 |
| 4,840,715 | 6/1989 | Misawa et al. | 204/181.1 |

*Primary Examiner*—John Niebling
*Assistant Examiner*—William T. Leader
*Attorney, Agent, or Firm*—Schwartz & Weinrieb

[57] ABSTRACT

An electrodeposition method wherein a conductive substrate such as, for example, a metal fastener is first coated by means of an anodic electrodeposition process, then subjected to thermal curing, and then subjected to a cathodic electrodeposition process. The anodic electrodeposition process is carried out until the coating insulates the substrate at which point the coating process stops. The curing step lowers the dielectric strength of the anodically deposited coating, thereby allowing the substrate to accept a cathodically deposited top coat. The resultant coated substrate demonstrates superior corrosion resistance properties and improved cosmetic appeal.

26 Claims, No Drawings

ANODIC-CATHODIC COATING FOR FASTENERS

BACKGROUND OF THE INVENTION

1. Field of the Invention

This invention relates generally to coating a conductive substrate by means of electrodeposition so as to achieve enhanced corrosion protection and improve cosmetic appeal. More particularly, this invention relates to coating metallic fasteners in bulk quantities using electrodeposition epoxy films. 2. Brief Description of the Prior Art It is well known in the art that a conductive substrate can be coated with a composition by means of electrodeposition. Coating a substrate can serve to protect it against corrosion and/or embellish its ornamental appearance.

Generally, there are two known types of electrodeposition processees—anodic electrodeposition and cathodic electrodeposition. Both methods are performed by inducing an electrical current within a coating cell containing a coating compound.

Anodic electrodeposition is accomplished by first immersing the part to be coated into an electrolytic solution containing the coating composition. A positive charge is imparted onto the conductive substrate to be coated. The negatively charged ionic species of the coating composition then move through the electrolyte medium via means of the electrophoretic phenomenon so as to coat the substrate. The coating process continues until the coating composition insulates the substrate at which point the coating process stops. Cathodic electrodeposition brings about similar results by reversing the electrical polarity so that the substrate to be coated acts as a cathode and attracts positively charged ions of the coating composition.

There are advantages and disadvantages associated with both methods of electrodeposition, but on balance, cathodic electrodeposition is generally preferred by the industry for most applications Anodic electrodeposition can provide an efficient and uniform coating upon both exposed and non-exposed or hidden surfaces of the substrate and the resultant coatings are far superior as compared to those attained by means of spray and dip coating methods. Over time, however, chemical side effects of the anodic process can destroy the surface of the conductive substrate and cause components thereof to infiltrate the coating material. Such infiltration can reduce corrosion resistance and promote coating discoloration, usually in the form of yellowing. Cathodic electrodeposition generally does not produce as many problems as are associated with anodic electrodeposition. Accordingly, it allows for broader use applications including the use of lighter-colored coatings. Cathodic electrodeposition also provides better gloss and color retention characteristics, as well as superior coating thickness capabilities. Nevertheless, anodic electrodeposition remains the preferred method for certain applications. For example, anodic electrodeposition of an epoxy film provides an ideal primer surface for a top coating of epoxy or acrylic materials or compositions.

U.S. Pat. No. 4,421,620, issued to Kaylo et al. on Dec. 20, 1983 (hereafter referred to as the '620 patent) discloses a process for preparing a corrosion-resistant metallic substrate by first anodically coating the substrate, and then, immediately, reversing the polarity of the coating cell and cathodically-coating the substrate with another layer of composition. The '620 patent, however, teaches that the substrate must remain electroconductive to a certain degree after being anodically-coated (see column 6, line 1). This requirement necessarily prohibits the substrate from becoming totally insulated by means of an anodic electrodeposition process and therefore limits the effectiveness of the anodic electrodeposition film.

OBJECTIVES OF THE INVENTION

It is a general objective of the present invention to provide a method of coating a conductive substrate for the purposes of enhancing corrosion resistance and improving cosmetic appeal.

It is a more specific objective of the present invention to provide a method of effectively electrodepositing an epoxy primer and an epoxy or acrylic top coat upon small metallic parts in bulk quantities.

It is a related objective to provide a coated substrate possessing improved corrosion resistance characteristics and an enhanced physical appearance.

SUMMARY OF THE INVENTION

Stated briefly, the inventive method utilized to produce the unique coated substrate comprises the sequential steps of anodically electrodepositing a first composition layer onto a metallic substrate, thermally curing the anodically coated substrate, and then cathodically electrodepositing a second composition layer onto the anodically coated substrate.

DETAILED DESCRIPTION OF THE INVENTION

The coating method of the present invention constitutes a unique series of steps which results in providing a conductive substrate with corrosion protection properties and cosmetic appeal heretofore unattainable.

One important use of the coating method disclosed is in the art of coating small metallic fasteners in bulk quantities with epoxy films. Hereinafter, such art will be used for the purpose of explanation and illustration without intending to limit the applications and uses of the invention in any way. Moreover, while the invention will be described in connection with a preferred procedure, it will be understood that it is not necessarily intended to limit the invention to this procedure. On the contrary, the invention is intended to cover all alternatives, modifications and equivalents as may be included within the spirit and scope of the invention as defined by means of the appended claims.

The disclosed method is intended for use, however, only with substrates and which are electrically conductive, which therefore are usually formed from some type of metallic substance. These pieces or parts to be coated may include a sacrificial metallic sub-coating such as, for example, zinc, cadmium, tin, or the like. Standard pretreating methods including phosphate or chromate conversion coating, acid etching and grit blasting are recommended for initially cleaning the parts to be coated.

The inventive process begins by anodically electrodepositing a film, such as, for example, an epoxy onto the metallic substrates by placing the substrates in a coating unit or cell and imparting a positive electrical charge of approximately 50 to 250 volts onto the substrates. A negative electrical charge placed upon cathodes within the coating unit, located at some predetermined distance away from the anodic substrates, creates a potential difference and causes a pH drop at the surface of the substrates. The pH drop in turn causes the epoxy present within the electrolyte to coat the surfaces of the substrates until a first, or "primer", coat of epoxy fully insulates the substrates. Preferably, the coated substrates are next rinsed so as to remove any excess coating. The anodic primer coat provides an ideal surface for the application of a second, or "top" coat of an epoxy or acrylic material, but is very susceptible to "touch points" or breaks in the coating caused by contact between multiple parts or with machinery. Moreover, a typical anodic primer coat affords only minimum corrosion protection.

Furthermore in accordance with the inventive method, the anodically coated substrates are then removed from the coating cell and thermally cured. In the preferred procedure, thermal curing is accomplished by means of heating the parts to approximately 350° F. for a period of approximately 20 minutes. Thermal curing all but eliminates the possibility of "touch points" and ultimately improves the cosmetic appearance of the coated substrates, as is more fully discussed below.

As a final step in the inventive method, the anodically coated substrates are re-immersed within an unspoiled coating cell and coated with a second, or "top" coating of epoxy by means of cathodic electrodeposition. This, of course, is accomplished in a manner similar to, but in reverse of, the anodic electrodeposition process. That is, a negative electrical charge of between approximately 50 to 400 volts is placed on the substrates to be coated, the charge being sufficient to overcome the dielectric strength of the "primer" coat. A positive electrical charge is then placed upon anodes located within the coating unit at some predetermined distance away from the now-cathodic substrates thereby causing the epoxy coating present within the unit to treat the surfaces of the substrates with a top coating of epoxy until the epoxy once again insulates the substrates at which time the top-coating process is terminated. The resultant coated substrates demonstrate corrosion resistance properties and cosmetic appeal heretofore unattainable by means of any known methods.

While it is not desired to be limited to any theory, the reason the above-described inventive method produces the superior results achieved appears to be related to the change in the dielectric strength of the "primer" coating of epoxy which occurs upon being thermally cured as described above. That is, the principal reason the anodically coated substrates can be top-coated seems to be because the cured anodic epoxy coating has a lower dielectric strength than the uncured anodic epoxy. This may be due to the presence of more non-conductive, space-filling water within the uncured epoxy than within the cured epoxy. Whatever the reason, the result is that the substrates will accept a top-coating of epoxy by material by means of cathodic electrodeposition, which heretofore could not be practically accomplished.

It has also been found that the superior results achieved by means of the inventive method disclosed cannot be attained by first cathodically electrodepositing the primer coating, curing the primer coating, and then anodically electrodepositing epoxy onto a substrates. The cured cathodic epoxy coating appears to have a much higher dielectric strength per unit thickness than the cured anodic epoxy coating or material.

After completing the inventive coating method, it is recommended that the parts be rinsed so as to remove any excess epoxy material and then cured a second time at approximately 350° F. for approximately 20 minutes.

Examples of typical thicknesses for both the "primer" and "top" coatings are listed in Table I as follows:

TABLE I

| (In Inches) | |
|---|---|
| Anodic Coatings: | .0001–.0004 |
| Cathodic Coatings: | .0001–.0007 |
| Total: | .0002–.0011 |

Table II compares the results achieved by performing the inventive method disclosed with the results of various other methods:

TABLE II

| Coating Method | Corrosion Resistance* | Cosmetic Appearance |
|---|---|---|
| Anodic Only | <24 hrs. | Touch points and pinholes. |
| Cathodic Only | ~48 hrs. | Touch points and pinholes. |
| Anodic/Anodic | <24 hrs. | Very few discernable mars in the film. |
| Inventive Method | ~96 hrs. | Very few discernable mars within the film. |

*ASTM-B117 Neutral Salt Spray Test. Number shown indicates hours of exposure to red rust.

It should be noted that a cathodic/cathodic coating method results in a very thin "top" coating due to a propensity for the epoxy material to evolve hydrogen at the surface of the substrates when the substrates are subjected to the required voltage. As a practical matter, this method is therefore not feasible.

Obviously, many modifications and variations of the present invention are possible in light of the above teachings. It is therefore to be understood that within the scope of the appended claims, the present invention may be practiced otherwise than as specifically described herein.

The invention is claimed as follows:

1. A method of coating a conductive substrate, comprising the sequential steps of:
   anodically electrodepositing a first composition layer, having a first dielectric strength value as deposited, onto said substrate so as to electrically insulate said substrate;
   thermally curing said electrically insulated anodically coated substrate so as to lower the dielectric strength of said anodically electrodeposited first composition layer from said first value to a second value which is less than said first dielectric strength value of said anodically electrodeposited layer so as to allow said anodically coated substrate to accept a cathodically electrodeposited composition layer thereon; and
   cathodically electrodepositing a second composition layer onto said anodically coated substrate.

2. The method recited in claim 1, wherein the substrate to be coated receives a sacrificial conductive sub-coating prior to said anodic electrodeposition step.

3. The method as set forth in claim 2, wherein:
   said sacrificial conductive sub-coating comprises a material selected from the group consisting of zinc, cadmium, and tin.

4. The method recited in claim 1, wherein the substrate to be coated is pretreated before said anodic electrodeposition step, and rinsed after said anodic electrodeposition step and after said cathodic electrodeposition step.

5. The method as set forth in claim 3, wherein:
said pretreatment of said substrate comprises a method selected from the group consisting of phosphate conversion coating, chromate conversion coating, acid etching, and grit blasting.

6. The method recited in claim 1, wherein an electrical charge of between 50 and 250volts is placed on the substrate during the anodic electrodeposition step.

7. The method recited in claim 1, wherein the thermal curing step is accomplished by heating the substrate to approximately 350° F. and continuing said heating for approximately 20 minutes.

8. The method recited in claim 1, wherein an electrical charge of approximately 50 to 400 volts is placed on the substrate during the cathodic electrodeposition step.

9. The method recited in claim 1, wherein said first and second composition layers each comprise an epoxy or acrylic film.

10. The method recited in claim 1, wherein the thickness of said first composition layer is between approximately 0.0001 and 0.0004 inches.

11. The method recited in claim 1, wherein the thickness of said second composition layer is between approximately 0.0001 and 0.0007 inches.

12. The method recited in claim 1, wherein the combined thickness of said first and second composition layers is approximately 0.0002 to 0.0011 inches.

13. The method recited in claim 1, wherein the conductive substrate comprises metal fasteners in bulk quantities.

14. A method of applying a coating to a conductive material so as to increase the corrosion resistance and enhance the cosmetic appearance of said conductive material, comprising the sequential steps of:
anodically electrodepositing a primer coat, having a first dielectric strength value as deposited, upon said conductive material so as to electrically insulate said material;
thermally curing said electrically insulated anodically coated material so as to lower the dielectric strength of said anodically electrodeposited primer coat from said first value to a second value which is less than said first dielectric strength value of said anodically electrodeposited primer coat so as to allow said anodically coated material to accept a cathodically electrodeposited top coat thereon; and
cathodically electrodepositing a top coat onto said anodically electrodeposited primer coat.

15. The method as set forth in claim 14, wherein:
said material to be coated receives a sacrificial conductive sub-coating prior to said anodic electrodeposition step.

16. The method as set forth in claim 15, wherein:
said sacrificial conductive sub-coating comprises a material selected from the group consisting of zinc, cadmium, and tin.

17. The method as set forth in claim 14, wherein:
said material to be coated is pretreated before said anodic electrodeposition step, and rinsed after said anodic electrodeposition step and after said cathodic electrodeposition step.

18. The method as set forth in claim 17, wherein:
said pretreatment of said material comprises a method selected from the group consisting of phosphate conversion coating, chromate conversion coating, acid etching, and grit blasting.

19. The method as set forth in claim 14, wherein:
an electrical charge of between 50 and 250 volts is placed upon said material during said anodic electrodeposition step.

20. The method as set forth in claim 14, wherein:
said thermal curing step is accomplished by heating said material to approximately 350° F. and continuing said heating for approximately twenty minutes.

21. The method as set forth in claim 14, wherein:
an electrical charge of approximately 50 to 400 volts is placed upon said material during said cathodic electrodeposition step.

22. The method as set forth in claim 14, wherein:
said primer coat and said top coat each comprise an epoxy or acrylic film.

23. The method as set forth in claim 14, wherein:
the thickness of said primer coat is between approximately 0.0001 and 0.0004 inches.

24. The method as set forth in claim 14, wherein:
the thickness of said top coat is between approximately 0.0001 and 0.0007 inches.

25. The method as set forth in claim 14, wherein:
the combined thickness of said primer and top coats is between approximately 0.0002 and 0.0011 inches.

26. The method as set forth in claim 14, wherein:
said material comprises metal fasteners in bulk quantities.

* * * * *